(12) United States Patent
Tummala et al.

(10) Patent No.: US 7,070,751 B2
(45) Date of Patent: Jul. 4, 2006

(54) PRODUCTION OF GASEOUS CHLORAMINE (75) Inventors: Srinivas Tummala, Plainsboro, NJ (US); Shun Wang Leung, Piscataway, NJ (US); Ehrlic T. Lo, Greenbrook, NJ (US); Mario Moisés Alvarez, Apodaca (MX)

(73) Assignee: Bristol-Myers Squibb Co., Princeton, NJ (US)

( * ) Notice: Subject to any disclaimer, the term of this patent is extended or adjusted under 35 U.S.C. 154(b) by 0 days.

(21) Appl. No.: 10/713,996

(22) Filed: Nov. 14, 2003

(65) Prior Publication Data
US 2004/0141905 A1    Jul. 22, 2004

Related U.S. Application Data

(60) Provisional application No. 60/426,104, filed on Nov. 14, 2002.

(51) Int. Cl.
*C01B 21/083* (2006.01)

(52) U.S. Cl. ............. 423/413; 422/129; 422/168; 422/173; 422/240; 423/284; 423/386; 423/388; 423/400; 423/466; 423/470; 423/486; 423/659

(58) Field of Classification Search ........... 422/129, 422/240, 168, 173; 423/659, 413
See application file for complete search history.

(56) References Cited

U.S. PATENT DOCUMENTS

| 1,850,057 A | 3/1932 | Baker et al. |
| 1,850,058 A | 3/1932 | Baker et al. |
| 2,837,409 A | 6/1958 | Sisler et al. |
| 3,488,164 A | 1/1970 | Grushkin et al. |
| 4,038,372 A | 7/1977 | Colli |
| 5,851,507 A | 12/1998 | Pirzada et al. |

FOREIGN PATENT DOCUMENTS

GB    1149836    2/1968

*Primary Examiner*—Wayne A. Langel
(74) *Attorney, Agent, or Firm*—Deanna L. Baxam (57) ABSTRACT

The present invention provides a reactor for the gas-phase reaction of commercially available gases in the presence of an inert carrier gas to form product gas. The reactor has a streamlined, compact configuration and at least one solids collection and removal system downstream of the reactor, where solids are efficiently removed from the product gas stream, leaving high purity product gas. The removal system allows for a simple reactor design, which is easy to clean and operates continuously over longer periods of time.

23 Claims, 6 Drawing Sheets

PRODUCTION OF GASEOUS CHLORAMINE

This application claims a benefit of priority from U.S. Provisional Application No. 60/426,104 the entire disclosure of which is herein incorporated by reference.

BACKGROUND OF THE INVENTION

1. Field of the Invention

The present invention relates to a process and apparatus for producing an inorganic compound. More particularly, the present invention relates to a gas-phase process and apparatus for producing an inorganic compound, for example, chloramine gas, from commercially available gases.

2. Description of the Prior Art

An efficient process for forming chloramine is the reaction of chlorine gas with ammonia, as set forth in the reaction below:

Examples of this basic reaction are disclosed in U.S. Pat. No. 2,837,409 to Sisler et al. and U.S. Pat. No. 3,488,164 to Grushkin et al.

The chlorine/ammonia reaction is especially effective if it is carried out by introducing gaseous chlorine into a large excess of gaseous ammonia, immediately mixing the reactants and withdrawing them from the reaction zone.

Although a highly desirable reaction, there are many drawbacks associated with the reaction of gaseous chlorine and gaseous ammonia. One notable drawback is the creation of the by-product ammonium chloride. At temperatures below 350° C., ammonium chloride condenses and solids precipitate from the product gas. The solids may foul the reactor if not properly controlled. To prevent or minimize this formation of solid ammonium chloride, the reaction must take place at a temperature above 350° C.

U.S. Pat. No. 4,038,372 to Colli discloses a process for manufacturing chloramine. The chloramine is formed from a gaseous reaction of chlorine and ammonia at about 360° C. The resulting product gas discharges to a discharge zone, which is heated to avoid ammonium chloride from precipitating out of the product gas. The product gas stream is then entrained in a high velocity jet of entraining gas. This gas cools the product gas stream and carries the gas stream to a filter system where the ammonium chloride solids are separated from the chloramine gas.

Great Britain Patent No. 1,149,836 discloses a process for the production of chloramine. The process includes the reaction of chlorine and ammonia in the presence of an inert diluent gas. The reaction takes place at a temperature of at least 250° C. The gaseous reaction products are maintained at a temperature of about 50° C. to about 250° C. until at least a portion of the ammonium chloride is solidified. The ammonium chloride is collected on a glass wool filter, and thereafter, the gaseous chloramine is recovered, preferably in a solvent.

The present invention overcomes the burdensome problem of the formation of solids by providing a novel reactor with a solids collection and removal system downstream of the reactor. This novel removal system allows for a simple reactor design, which is easy to clean and continuously operates over longer periods of time.

SUMMARY OF THE INVENTION

It is an object of the present invention to provide a reactor for the continuous production of inorganic compounds.

It is another object of the present invention to provide one or more means for removing solids from the product gas stream to avoid fouling the reactor.

It is a further object of the present invention to provide such a reactor that has a simple streamlined design.

It is yet a further object of the present invention to provide such a reactor that is easy to clean.

It is still a further object of the present invention to provide such a reactor that has an increased continuous operation time.

These and other objects of the present invention are achieved by a gas-phase reaction of commercially available feed gases in the presence of an inert carrier gas in a novel reactor to form process gas compounds. The term "feed gas" or "feed gases" is meant, for purposes of this application, to include reactive gas(es) used in the processes of the present invention. The reactor has a streamlined, compact configuration and a solids collection and removal system downstream of the reactor, where solids are efficiently removed from the product gas stream, leaving high purity product gas. This novel removal system allows for a simple reactor design, which is easy to clean and operates continuously over longer periods of time. In a preferred embodiment, the novel reactor is used to form chloramine product gas.

DETAILED DESCRIPTION OF THE INVENTION

Figure 1:
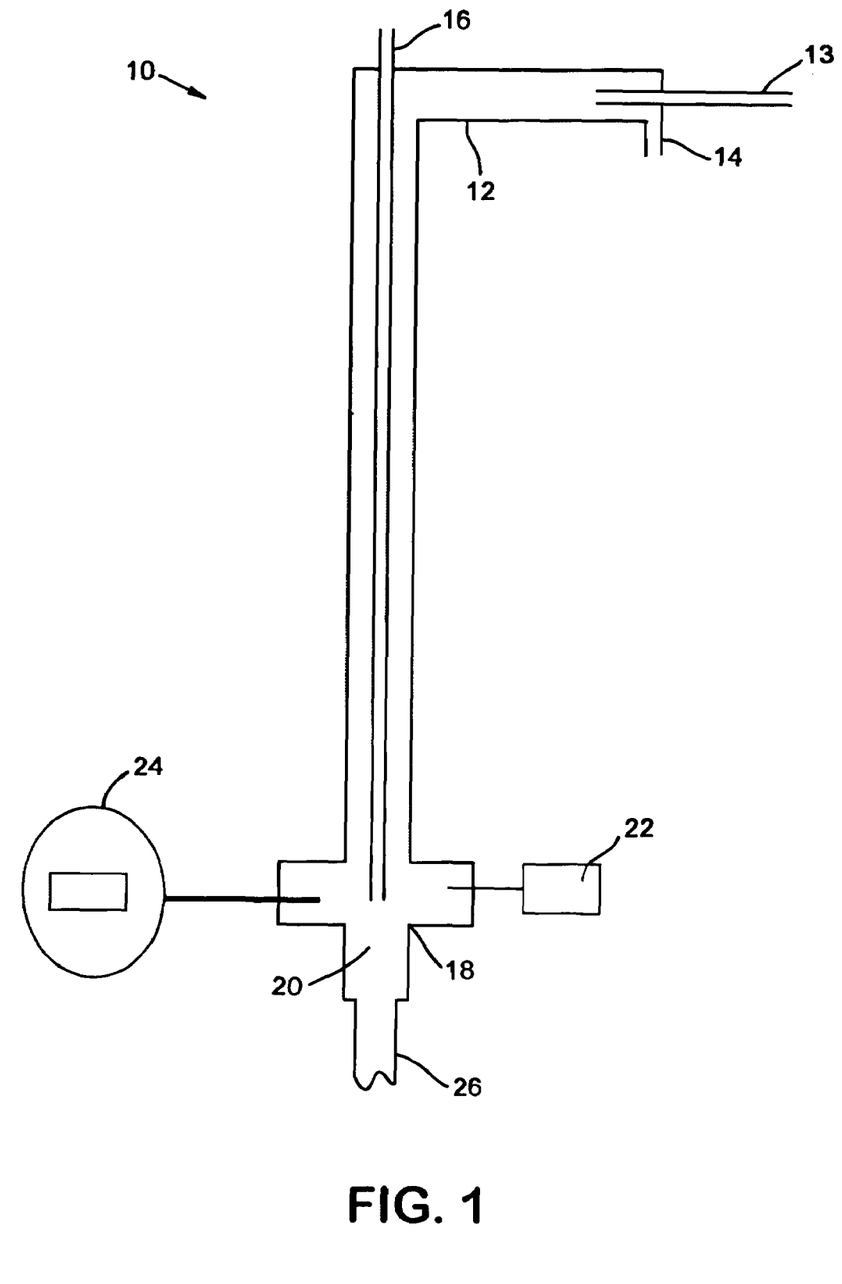
FIG. 1 is a plan view of a reactor according to the present invention.

Referring to FIG. 1, a gas-phase reactor according to the present invention is represented generally by reference numeral 10. Reactor 10 has an outer shell tube 12 and an inner tube 16, both of which feed reaction chamber 18. At least one first commercially available feed gas is fed to outer tube 12 via first inlet 13. One or more inert gases is fed to outer tube 12 via second inlet 14. The one or more inert gases act as a diluent and as a carrier for the at least one first commercially available gas. At least one additional or second commercially available feed gas is concentrically fed (i.e., one or more feed tubes positioned within one or more additional feed tubes) to reaction chamber 18 via inner shell tube 16. By concentrically feeding the feed gas to reaction chamber 18, the reaction occurs immediately upon discharge of the feed gas to the reaction chamber, thus providing a more efficient reaction. As a result, a greater conversion of feed gas to product gas results, thus avoiding the undesirable formation of solids in reaction chamber 18.

Suitable commercially available feed gases for use in the reactor of the present invention include, without limitation, acetylene, ammonia, boron trichloride, boron trifluoride, butadiene, butane, butene, carbon dioxide, carbon monoxide, chlorine, cis-2-butene, deuterium, dimethylamine, dimethyl ether, ethane, ethylene, ethyl chloride, hydrogen, hydrogen bromide, hydrogen chloride, hydrogen sulfide, isobutane, isobutylene, methane, methyl bromide, methyl chloride, methyl mercaptan, methylamine, nitric oxide, nitrogen dioxide, nitrous oxide, oxygen, perfluoropropane, propane, propylene, sulfur dioxide, sulfur hexafluoride, trans-2-butene, trimethylamine, or any combinations thereof.

Suitable inert gases for use in the present invention include, but are not limited to, nitrogen, argon, helium, neon, or any combinations thereof.

By way of example, reactions using the novel reactor of the present invention may include, but are not limited to, the following:

$$Cl_2 + 2NH_3 \rightarrow NH_2Cl + NH_4Cl$$

$$NH_3 + BCl_3 \rightarrow Cl_3B-NH_3$$

$$SO_3 + NH_3 \rightarrow SO_3NH_3$$

$$Cl_2 + HBr \rightarrow HCl + BrCl$$

$$Cl_2 + NO \rightarrow NO_2 + ClNO$$

In one embodiment of the present invention, chloramine gas is produced using the novel reactor of the present invention.

Chlorine or chlorine containing gas is fed to the reactor via first inlet 13 and outer tube 12 at a flow rate about 0.001 ft$^3$/min to about 0.1 ft$^3$/min. Preferably, the chlorine gas is fed to the reactor at a flow rate about 0.01 ft$^3$/min to about 0.05 ft$^3$/min, and more preferably about 0.0125 ft$^3$/min to about 0.015 ft$^3$/min.

The inert gas is fed to the reactor via second inlet 14 and outer tube 12 at a flow rate about 0.1 ft$^3$/min to about 1 ft$^3$/min. Preferably, the inert gas is fed to the reactor at a flow rate about 0.12 ft$^3$/min to about 0.36 ft$^3$/min, and more preferably 0.15 ft$^3$/min to about 0.18 ft$^3$/min.

Gaseous ammonia is fed to the reactor via inner shell tube 16 at a flow rate of about 0.002 ft$^3$/min to about 0.2 ft$^3$/min. Preferably, the gaseous ammonia is fed to the reactor at a flow rate about 0.032 ft$^3$/min to about 0.096 ft$^3$/min, and more preferably about 0.04 ft$^3$/min to about 0.048 ft$^3$/min.

A critical aspect of the present invention, when forming chloramine gas, is the pre-mixing of the chlorine gas and inert gas prior to preheating the gases. Chlorine gas by itself is highly corrosive at higher temperatures. It has been found that by mixing the chlorine gas and inert gas prior to heating reduces and/or eliminates the corrosiveness of the chlorine gas. As a result, materials that are less expensive and easier to machine can be used for making reactor 10 of the present invention.

Suitable materials for constructing reactor 10 of the present invention include, but are not limited to, hastelloy C, stainless steel, brass, borosilicate glass, silicate, sodium silicate, potassium silicate, silica, or any combinations thereof. Preferably, the materials used to construct reactor 10 include hastelloy C, stainless steel, or a combination thereof.

Another important aspect of the present invention is the preheating of all of the gases prior to their introduction to reaction chamber 18. As a result of preheating the feed gases, a smaller, more compact reactor can be used without the problem of the reactor fouling with solids, such as ammonium chloride in the case of chloramine. In addition, the higher temperatures provide higher conversion rates and/or selectivity. This provides a key advantage to continuously and efficiently producing product gas.

The device or element for heating the feed gases include, for example, heat tape, high resistivity wire, steam, furnace, or any combinations thereof. Preferably, heat tape is used to heat outer shell tube 12, which in turn heats both chlorine gas and inert gas flowing through outer tube 12 and the gaseous ammonia flowing through inner tube 16.

In the case of chloramine gas formation, outer shell tube 12 and inner tube 16 discharge into reaction chamber 18. The chlorine gas reacts with the ammonia gas at reaction zone 20 in reaction chamber 18. Reaction chamber 18 is heated to a temperature in excess of about 350° C. by one or more heating elements 22 and measured by one or more temperature sensors associated with heating elements 22. It is critical to the invention that the reaction occur at a temperature in excess of about 350° C. to prevent the condensation and precipitation of ammonium chloride, a by-product of the gas-phase reaction occurring in reaction chamber 18.

A device or element for heating reaction zone 20 include, for example, heat tape, high resistivity wire, steam, furnace, and any combinations thereof. Preferably, heat tape is used.

The product gas stream exits reaction chamber 18 via discharge tube 26 at a temperature still in excess of about 350° C.

Figure 2:
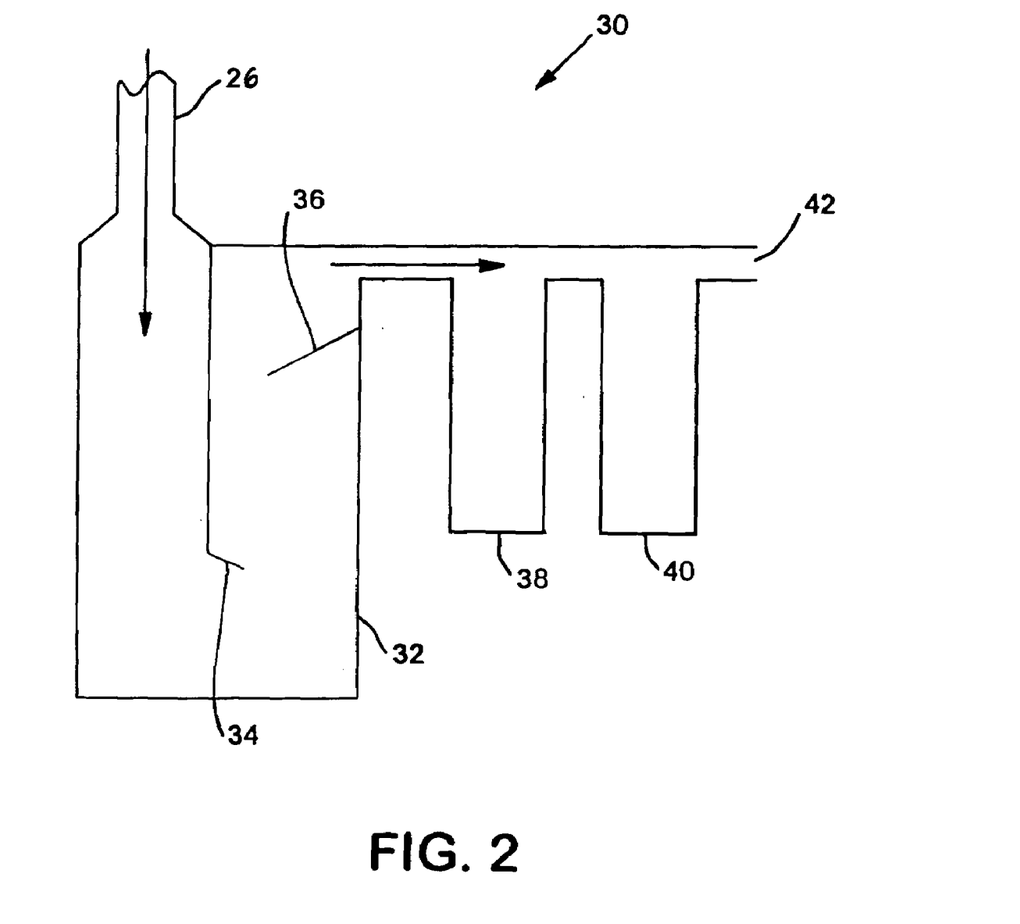
FIG. 2 is a plan view of a solids collection and removal system according to the present invention.

Referring to FIG. 2, the product gas stream, via discharge tube 26, enters a solids collection system according to the present invention, represented generally by reference numeral 30. Solids collection system 30 has a trap 32 with one or more baffles 34, 36. Baffles 34, 36 help collect solids that may have precipitated out of the product gas. Following trap 32, solids collection system 30 has one or more filters 38, 40. Filters 38, 40 further collect any precipitated solids that may be in the product gas. The product gas discharges from solids collection system 30 via discharge line 42.

Any suitable filters, compatible with the desired product gas, may be used with solids collection system 30. Suitable filters for use in solids collection system 30 of the present invention include, but are not limited to, one or more cartridge filters, bag filters, granular bed filters, or any combinations thereof. Preferably, one or more cartridge filters are used. In a preferred embodiment of the present invention, one or more cartridge filters sold under the tradenames CT-101A® and Micro-Klean III® by CUNO may be used.

Figure 3:
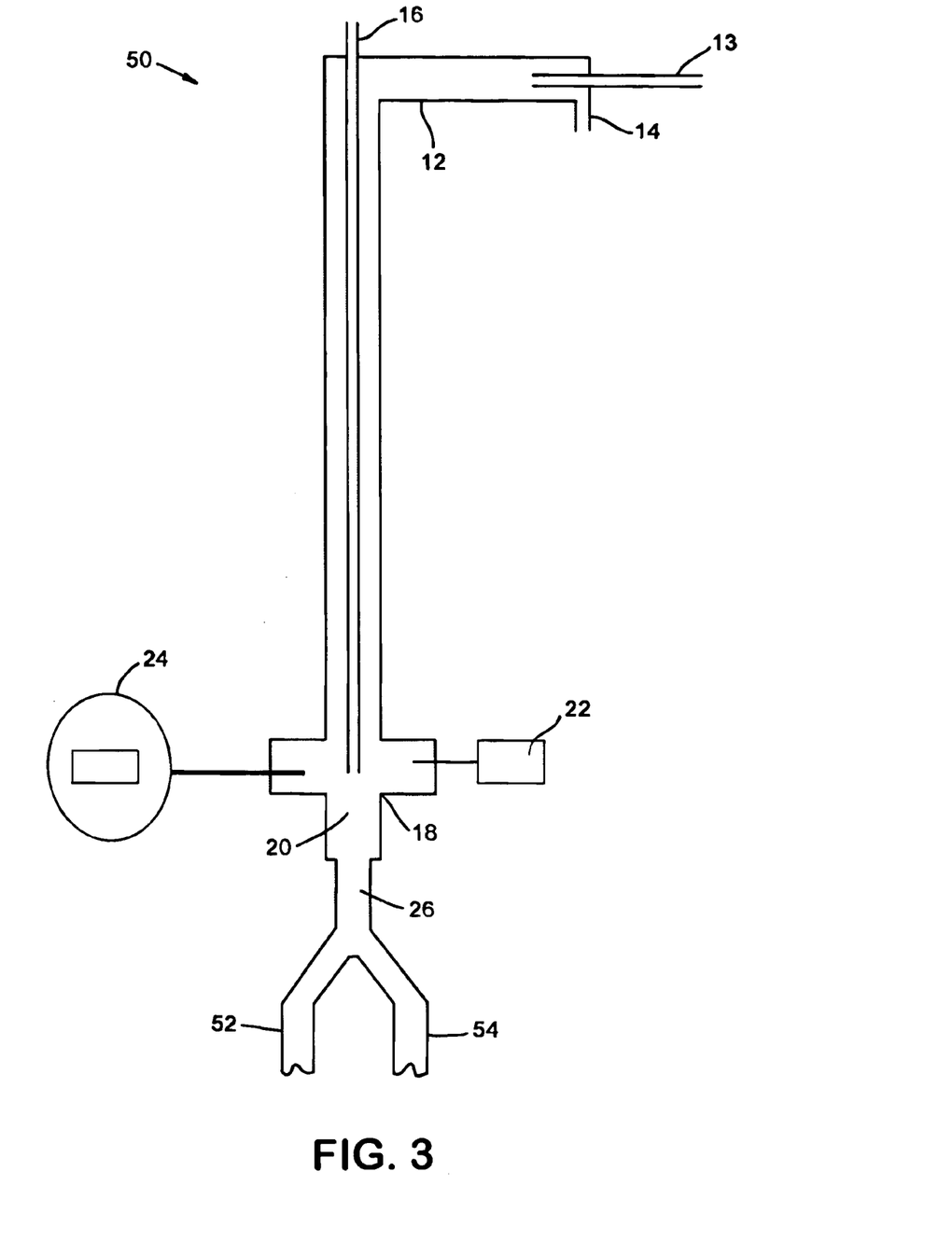
FIG. 3 is a plan view of a reactor with a split discharge line according to an embodiment of the present invention.

Referring to FIG. 3, another embodiment of a reactor according to the present invention is represented generally by reference numeral 50. Reactor 50 has the same attributes as those described with respect to reactor 10 set forth above, however, reactor 50 has discharge tube 26 that feeds product gas to at least two solid collection system feed tubes 52, 54.

Figure 4:
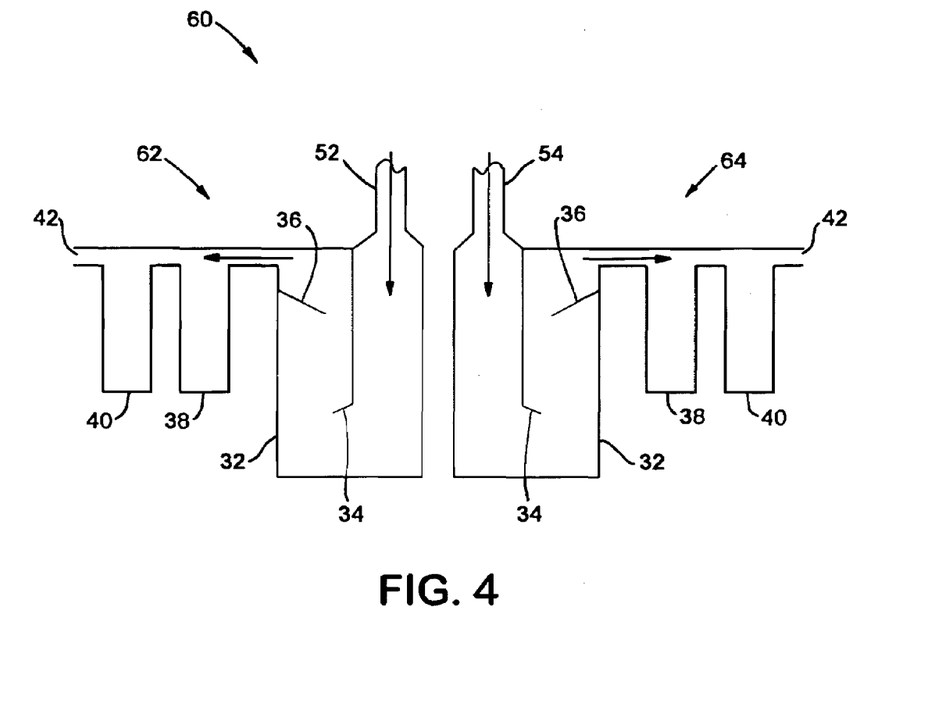
FIG. 4 is a plan view of a solids collection and removal system with two collection units according to an embodiment of the present invention.

Referring to FIG. 4, a solids collection system for use with the reactor depicted in FIG. 3 is represented generally by reference numeral 60. Solids collection system 60 has the same attributes as those set forth above for solids collection system 30 depicted in FIG. 2, however, system 60 has two collection units 62, 64.

Collection unit 62 receives product gas via collection system feed tube 52. Collection unit 64 receives product gas via collection system feed tube 54. Both collection units 62, 64 remove solids from the product gas by the same mechanisms described above for collection system 30 depicted in FIG. 2.

A benefit of having more than one solids collection system according to the present invention is that it provides an end user of the reactor with various operating configurations to optimize the continuous production of the desired product gas. For example, the reactor with two or more collection system tubes, and corresponding collection systems, can be operated simultaneously on a continuous basis.

In another embodiment, the reactor with two or more collection system tubes and corresponding solids collection systems can be run in parallel, but not simultaneously. Therefore, when one or more collection systems require maintenance, those collection systems can be taken off-line, while one or more remaining collection systems either remain on-line or are put into service to replace the systems taken off-line. As a result, the continuous process never requires down time due to maintenance of the two or more solids collection systems.

It should be understood that while FIG. 3 depicts a reactor with two collection system feed tubes and FIG. 4 depicts two associated solid collection systems, one skilled in the art would appreciate that the present invention can be configured with any number of collection system feed tubes and associated solids collection systems to ensure continuous operation and production of product gas.

Figure 5:
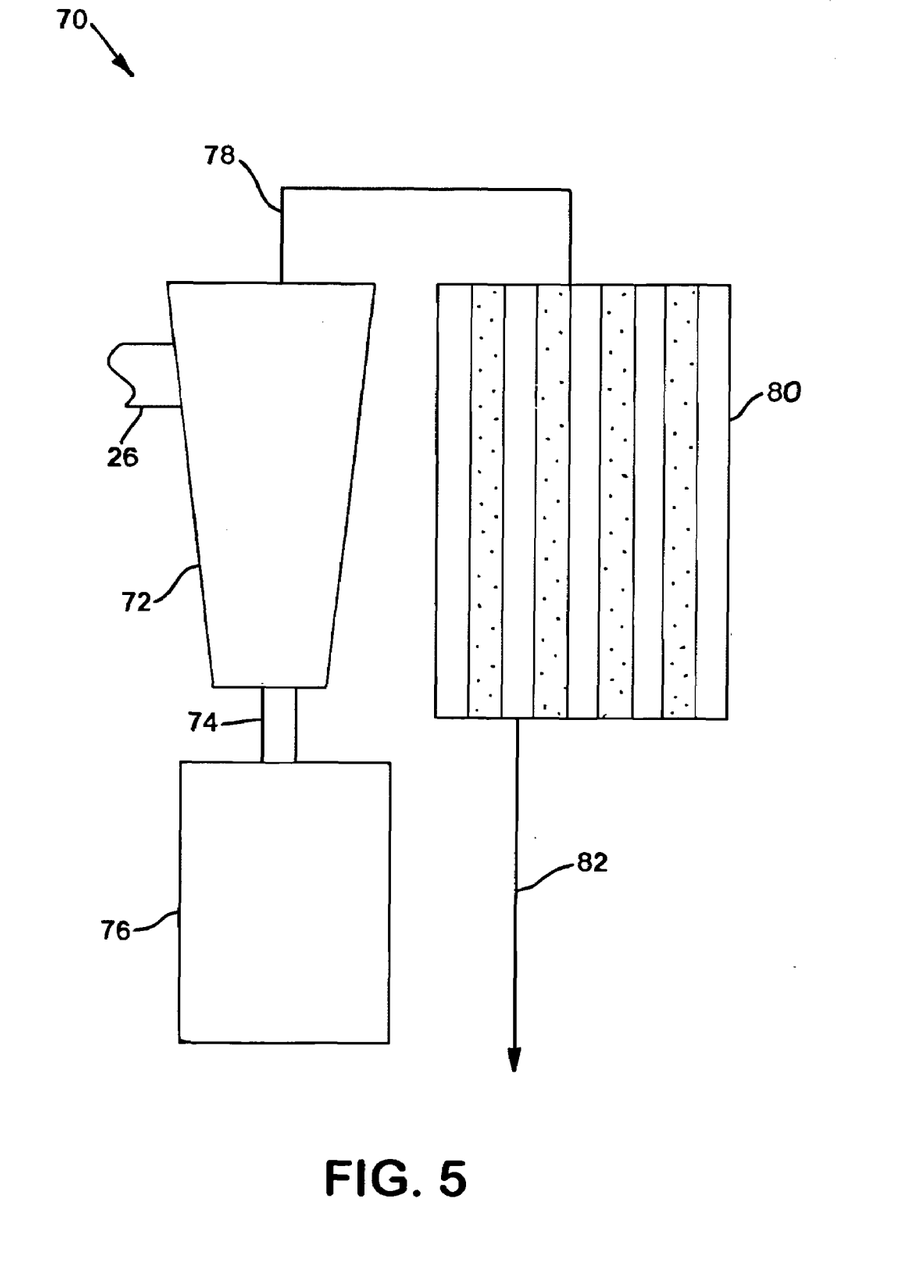
FIG. 5 is a plan view of another embodiment of a solids collection system according to the present invention.

Referring to FIG. 5, another embodiment of a solids collection system according to the present invention is represented generally by reference numeral 70. Solids collection system 70 has cyclone 72, to which product gas is fed via reactor discharge tube 26. Cyclone 72 is effective at removing any solids that may have precipitated out of the product gas. Any solids removed by cyclone 72 will collect in collection drum 76. Product gas exits cyclone 72 via cyclone discharge line 78, which in turn feeds filter 80. Filter 80 further collects any remaining solids that may have precipitated out of the product gas. The product gas discharges from filter 80 via filter discharge line 82.

It should be understood that while FIG. 5 depicts a reactor with one solids collection system, one skilled in the art would appreciate that the present invention can be configured with any number of collection systems, similar to those set forth above with respect to FIGS. 3 and 4, to ensure continuous operation and production of product gas. In addition, any combination of the solids collection systems depicted in FIGS. 2, 4 and 5 may be configured, as will be appreciated by one skilled in the art.

The present invention is further illustrated by the following example.

EXAMPLE 1

$Cl_2$ was diluted in 12 parts of $N_2$. Ammonia gas was charged at a stoichiometric amount with a slight excess. The first run flowed 0.125 L/min $Cl_2$ mixed with 1.5 L/min $N_2$, which was reacted with 0.3 L/min $NH_3$. The two gases were reacted at temperatures between 350° C. to 400+° C. The total reaction time to convert 10 kilos was 170 hours. The throughput was then increased four times by increasing the flow rates by four times. However, the $N_2$ ratio was decreased three times to 2 L/min in order to increase the overall throughput while minimizing the increase in the overall flowrate.

In order to monitor the progress of the reaction, a GC/MS was placed in-line with the reaction. By splitting the stream exiting the second filter, one of the streams was sent directly into the GC/MS. This apparatus was able to quantify the ratio between the amounts of chloramine, ammonia, and chlorine exiting the reactor by comparing the size of the peaks of elements with certain molecular weights. A sample of this data can be seen in FIG. 6.

Figure 6:
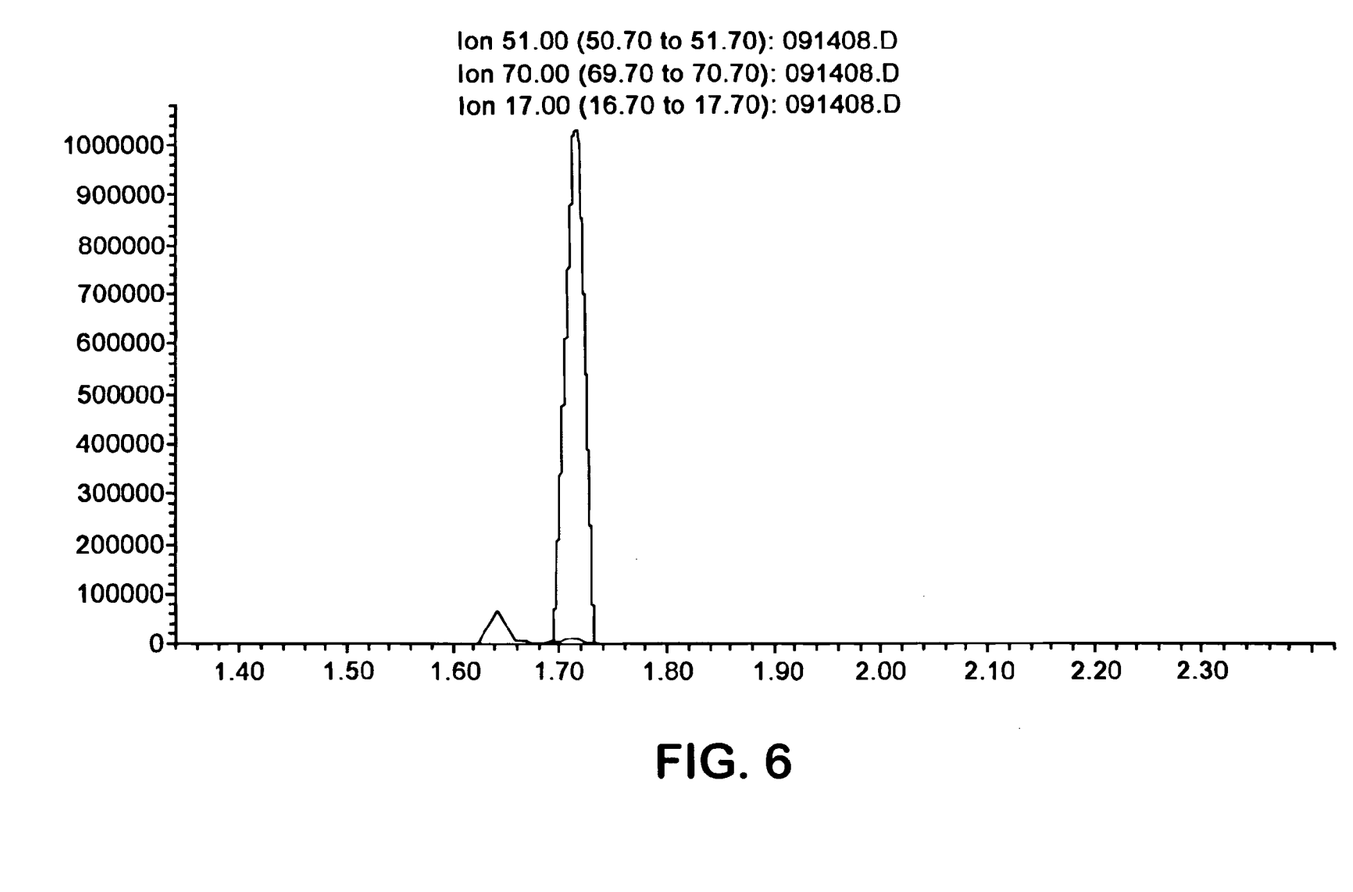
FIG. 6 is a graph illustrating the abundance of chloramine with relation to ammonia and chlorine in a product gas formed according to the present invention.

It can be seen from FIG. 6 that the stream consists almost entirely of chloramine at a ratio greater than 10:1 with respect to ammonia. Ammonia is expected because there is a slight excess being fed into the reactor. It can also be seen that chlorine does not appear because it is almost entirely consumed in the reaction.

It is to be understood that what has been described is merely illustrative of the principles of the invention and that numerous arrangements in accordance with this invention may be devised by one skilled in the art without departing from the spirit and scope thereof.

What is claimed is:

1. A process for the continuous production of inorganic gas, comprising the steps of:
    (a) providing a reactor with a reaction zone, the reactor comprising at least one reactor discharge tube in flow communication with the reaction zone;
    (b) feeding at least two feed gases concentrically to the reaction zone;
    (c) reacting the at least two feed gases in the reaction zone, thereby forming a product gas;
    (d) providing at least one solids collection system positioned downstream of the reaction zone and in flow communication with the at least one reactor discharge tube; and
    (e) flowing the product gas via the at least one reactor discharge tube to the at least one solids collection system,
    wherein at least one of said at least two feed gases is heated prior to being fed to the reaction zone.

2. The process of claim 1, wherein said reactor further comprises at least two reactor feed tubes far concentrically feeding the at least two feed gases to the reaction zone.

3. The process of claim 1, wherein at least one of said at least two feed gases is heated to a temperature greater than 350° C.

4. The process of claim 1, wherein said reactor is constructed from a material selected from the group consisting of hastelloy C, stainless steel, brass, borosilicate glass, silicate, sodium silicate, potassium silicate silica, and any combinations thereof.

5. The process of claim 1, wherein said at least two feed gases are selected from the group consisting of acetylene, ammonia, boron trichloride, boron trifluoride, butadiene, butane, butane, carbon dioxide, carbon monoxide, chlorine, cis-2-butene, deuterium, dimethylamine, dimethyl ether, ethane, ethylene, ethyl chloride, hydrogen, hydrogen bromide, hydrogen chloride, hydrogen sulfide, isobutane, isobutylene, methane, methyl bromide, methyl chloride, methyl mercaptan, methylamine, nitric oxide, nitrogen dioxide, nitrous oxide, oxygen, perfluoropropane, propane, propylene, sulfur dioxide, sulfur hexafluoride, trans-2-butene, trimethylamine, and any combinations thereof.

6. The process of claim 1, further comprising feeding at least one inert gas concurrently with at least one of said at least two feed gases.

7. The process of claim 6, wherein said at least one inert gas is selected from the group consisting of nitrogen, argon, helium, neon, and any combinations thereof.

8. The process of claim 1, wherein said at least one solids collection system is selected from the group consisting of trap, filter, cyclone, and any combinations thereof.

9. The process of claim 8, wherein said filter is selected from the group consisting of cartridge, bag, granular bed, and any combinations thereof.

10. An apparatus for the continuous production of gaseous compounds, the apparatus comprising:
  (a) at least one reactor comprising a reaction zone and at least one reactor discharge tube in flow communication therewith, the reactor having at least two reactor feed tubes for concentrically feeding feed gas to the reaction zone;
  (b) at least one solids collection system positioned downstream of and separate from the reaction zone, which is in flow communication with the at least one said reactor discharge tube; and
  (c) a device or element for heating the feed gas prior to introduction of the feed gas to the reaction zone.

11. The apparatus of claim 10, wherein said at least one reactor is constructed from a material selected from the group consisting of hastelloy C, stainless steel, brass, borosilicate glass, silicate, sodium silicate, potassium silicate silica, and any combinations thereof.

12. The apparatus of claim 10, wherein said at least one solids collection system is selected from the group consisting of trap, filter, cyclone, and any combinations thereof.

13. The apparatus of claim 12, wherein said filter is selected from the group consisting of cartridge, bag, granular bed, and any combinations thereof.

14. A process for the continuous production of chloramine gas comprising the steps of:
  (a) providing a reactor having a reaction zone, a first feed gas tube and a second feed gas tube that concentrically feed gas to the reaction zone, the reactor further comprising at least one reactor discharge tube;
  (b) providing at least one solids collection system positioned downstream of the reaction zone and in communication with the at least one reactor discharge tube;
  (c) feeding a chlorine-containing gas to the first feed gas tube;
  (d) feeding ammonia to the second feed gas tube;
  (e) reacting the chlorine-containing gas with the ammonia in the reaction zone, thereby forming chloramine gas; and
  (f) flowing the chloramine gas via the at least one reactor discharge tube to the at least one solids collection system, wherein said chlorine-containing gas, said ammonia, or both said chlorine-containing gas and said ammonia are heated prior to step (d).

15. The process of claim 14, wherein said chlorine-containing gas, said ammonia, or both are heated to a temperature greater than 350° C.

16. The process of claim 14, wherein said chlorine-containing gas is fed to the reaction zone at a flow rate of about 0.001 ft$^3$/min to about 0.1 ft$^3$/min.

17. The process of claim 14, wherein said ammonia is fed to the reaction zone at a flow rate of about 0.002 ft$^3$/min to about 0.2 ft$^3$/min.

18. The process of claim 14, further comprising feeding inert gas to said reaction zone concurrently with said chlorine-containing gas.

19. The process of claim 18, wherein said inert gas is selected from the group consisting of nitrogen, argon, helium, neon, and any combinations thereof.

20. The process of claim 19, wherein said inert gas is fed at a flow rate of about 0.1 ft$^3$/min to about 1 ft$^3$/min.

21. The process of claim 14, wherein the reactor is constructed from a material selected from the group consisting of hastelloy C, stainless steel, brass, borosilicate glass, silicate, sodium silicate, potassium silicate silica, end any combinations thereof.

22. The process of claim 14, wherein said at least one solids collection system is selected from the group consisting of trap, filter, cyclone, and any combinations thereof.

23. The process of claim 22, wherein said filter is selected from the group consisting of cartridge, bag, granular bed, and any combinations thereof.

* * * * *